United States Patent
Hong et al.

(10) Patent No.: US 12,477,111 B2
(45) Date of Patent: Nov. 18, 2025

(54) PARAMETERIZED NOISE SYNTHESIS FOR GRAPHICAL ARTIFACT REMOVAL

(71) Applicant: GOOGLE LLC, Mountain View, CA (US)

(72) Inventors: Danny Hong, New York, NY (US); Richard Xie, Cupertino, CA (US); Ramachandra Tahasildar, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/276,580

(22) PCT Filed: Feb. 12, 2021

(86) PCT No.: PCT/US2021/017816
§ 371 (c)(1),
(2) Date: Aug. 9, 2023

(87) PCT Pub. No.: WO2022/173440
PCT Pub. Date: Aug. 18, 2022

(65) Prior Publication Data
US 2024/0129468 A1      Apr. 18, 2024

(51) Int. Cl.
*H04N 19/124*      (2014.01)
*H04N 19/70*      (2014.01)

(52) U.S. Cl.
CPC ........... *H04N 19/124* (2014.11); *H04N 19/70* (2014.11)

(58) Field of Classification Search
CPC .............................. H04N 19/124; H04N 19/70
See application file for complete search history.

(56) References Cited

U.S. PATENT DOCUMENTS

| | | | |
|---|---|---|---|
| 2006/0256873 A1 | 11/2006 | Gomila et al. | |
| 2007/0047658 A1 | 3/2007 | Tourapis et al. | |
| 2008/0063085 A1* | 3/2008 | Wu ...................... | H04N 19/117 375/240.26 |

(Continued)

FOREIGN PATENT DOCUMENTS

| | | |
|---|---|---|
| JP | 2018082299 A | 5/2018 |
| WO | 2005032142 A1 | 4/2005 |

(Continued)

OTHER PUBLICATIONS

International Preliminary Report on Patentability mailed Aug. 24, 2023 for corresponding International Application No. PCT/US2021/017816, 9 pages.

(Continued)

*Primary Examiner* — Zhubing Ren (57) ABSTRACT

Pre-encoding noise parameterization techniques mitigate or eliminate banding and other graphical artifacts in video frames for decoding and presentation by a client device. For one or more input video frames, a quantization parameter associated with the input video frames is identified. Noise synthesis parameters are determined based on the identified quantization parameter, and the input video frames are encoded for transmission. The encoded video frames are transmitted to the client device along with the determined noise synthesis parameters, for use by the client device in generating synthetic noise to add to resulting video frames decoded by the client device.

22 Claims, 10 Drawing Sheets

(56) References Cited

U.S. PATENT DOCUMENTS

| | | | |
|---|---|---|---|
| 2008/0152296 A1* | 6/2008 | Oh | H04N 19/80 375/E7.193 |
| 2009/0076828 A1* | 3/2009 | Li | G10L 25/69 704/500 |
| 2010/0246689 A1 | 9/2010 | Filippini et al. | |
| 2012/0087411 A1 | 4/2012 | Haskell | |
| 2015/0010048 A1* | 1/2015 | Puri | H04N 19/139 375/240.02 |
| 2020/0389673 A1* | 12/2020 | Helmrich | H04N 19/625 |
| 2021/0144377 A1* | 5/2021 | Lei | H04N 19/147 |
| 2022/0400270 A1* | 12/2022 | Meardi | H04N 19/60 |

FOREIGN PATENT DOCUMENTS

| | | |
|---|---|---|
| WO | 2014078068 A1 | 5/2014 |
| WO | 2019166317 A1 | 9/2019 |
| WO | 2020188273 A1 | 9/2020 |

OTHER PUBLICATIONS

International Search Report and Written Opinion mailed Nov. 5, 2021 for corresponding International Application No. PCT/US2021/017816, 15 pages.

Oh, B.T. et al., "Advanced Film Grain Noise Extraction and Synthesis for High-Definition Video Coding", IEEE Transactions on Circuits and Systems for Video Technology, vol. 19, Issue 12; Dec. 2009; pp. 1717-1729.

Norkin, A. et al., "Film Grain Synthesis for AV1 Video Codec", IEEE Data Compression Conference; Mar. 27, 2018; https://norkin.org/pdf/DCC_2018_AV1_film_grain.pdf; 10 pages.

Translation of Japanese Notice of Reasons for Refusal mailed Feb. 26, 2025 for JP Application Number 2023-548606, 4 pages.

Communication pursuant to Article 94(3) EPC mailed Sep. 10, 2025, 10 pages.

* cited by examiner

| a0 | a1 | a2 | a3 | a4 | a5 | a6 |
|----|----|----|----|----|----|----|
| a7 | a8 | a9 | a10 | a11 | a12 | a13 |
| a14 | a15 | a16 | a17 | a18 | a19 | a20 |
| a21 | a22 | a23 | X | | | |

PARAMETERIZED NOISE SYNTHESIS FOR GRAPHICAL ARTIFACT REMOVAL

CROSS-REFERENCE TO RELATED APPLICATIONS

The present application is a U.S. National Stage under 35 U.S.C. § 371 of International Patent Application Serial No. PCT/US2021/017816, entitled "PARAMETERIZED NOISE SYNTHESIS FOR GRAPHICAL ARTIFACT REMOVAL" and filed on Feb. 12, 2021, the entirety of which is incorporated by reference herein.

BACKGROUND

"Cloud gaming" or "game streaming" typically involves executing a video game application on one or more remote servers and providing the resulting video and audio content as a video stream and audio stream, respectively, that is transmitted over one or more networks to a user's client device. By utilizing at least one remote server (i.e., "the cloud") to perform some or all aspects of the associated tasks of graphics rendering, video capture, video encoding, and video streaming, a user may run performance-taxing game applications without using a high-end hardware client to device. Instead, the user may typically need only a display screen, a device capable of playing a video stream, and one or more user input devices.

However, due to video encoding processes typically utilized in cloud gaming scenarios, banding or other graphical artifacts may be visible in the provided output video stream, such as in dark or low-detail areas of the game content. These graphical artifacts may be distracting to the user, and may operate as a disincentive to use cloud gaming platforms.

SUMMARY OF EMBODIMENTS

In embodiments described herein, efficient real-time noise parameterization techniques are provided for mitigating or eliminating banding and other graphical artifacts, such as may be useful in cloud gaming or other video streaming applications. For one or more input video frames, a quantization parameter to be associated with the input video frames is identified. Noise synthesis parameters are determined based on the identified quantization parameter, and the input video frames are encoded for transmission. The encoded video frames are transmitted to the client device along with the determined noise synthesis parameters, for use by the client device in generating synthetic noise to add to resulting video frames decoded by the client device. In certain embodiments, determination of the noise synthesis parameters may further be based on one or more video frame characteristics identified as part of pre-processing the one or more input video frames.

In one example embodiment, a method may comprise, for one or more input video frames: identifying a quantization parameter (QP) associated with the one or more input video frames; encoding, using the identified QP, the one or more input video frames for transmission to at least one client device; determining, based at least in part on the identified QP, one or more noise synthesis parameters; and initiating transmission of one or more encoded video frames to the at least one client device based on the encoding of the one or more input video frames. Initiating the transmission includes providing the determined one or more noise synthesis parameters to the at least one client device so that one or more noise synthesis parameters are transmitted to the at least one client device in addition to quantized signals representing the one or more encoded video frames.

The method may further comprise generating the one or more input video frames via a game application. This may include that the one or more input video frames relate to synthetic video content (in contrast to video content resulting from real world images captured by a camera device).

Generally, the one or more noise synthesis parameters may be determined as a function of an identified QP. For example, depending on a certain value of a QP identified for at least one pixel of the video frame to be encoded or on a range of values in which an identified QP lies, a mapping function may be used for altering (e.g., scaling) or calculating a noise synthesis parameter associated with the at least one pixel.

The method may further comprise pre-processing the one or more input video frames prior to the encoding. The method may still further comprise identifying one or more video frame characteristics based on the pre-processing of the input video frames. The determining of the one or more noise synthesis parameters may be further based in part on the one or more video frame characteristics. The one or more additional video frame characteristics may include a variance of at least one of the one or more input video frames.

Encoding the one or more input video frames for transmission may include encoding the one or more input video frames in accordance with an AV1 video coding standard, including encoding the one or more input video frames using a film grain synthesis process as defined in the AV1 video coding standard. With respect to certain embodiments, the present disclosure in particular may relate to encoding the one or more input video frames in accordance with the AV1 video coding standard, version 1.0.0 published on Jan. 18, 2019 and any later version, in particular insofar as the corresponding standard version defines a film grain synthesis process.

Encoding the one or more input video frames for transmission may also include encoding the one or more input video frames in accordance with the Advanced Video Coding (AVC) or "H.264" standard (such as version 1 as released on May 30, 2003, or any later version), VP9 (released on Jun. 17, 2013), and High Efficiency Video to Coding (HEVC) (such as version 1 as released on Apr. 13, 2013, or any later version).

Providing the determined noise synthesis parameters may include providing the determined noise synthesis parameters for use by the at least one client device in synthesizing noise to apply to the one or more transmitted video frames.

In another example embodiment, a system may comprise a first processor to, for one or more input video frames: identify a quantization parameter (QP) associated with the one or more input video frames; encode, using the identified QP, the one or more input video frames for transmission to at least one client device; determine, based at least in part on the identified QP, one or more noise synthesis parameters; and initiate transmission of one or more encoded video frames to the at least one client device based on the encoding of the one or more input video frames. To initiate the transmission may include to provide the determined one or more noise synthesis parameters to the at least one client device.

The first processor may be further to pre-process the one or more input video frames. The first processor may be further to identify one or more video frame characteristics based on the pre-processing of the input video frames To determine the one or more noise synthesis parameters may be further based on the one or more video frame characteristics. The one or more video frame characteristics may include a variance of at least one of the one or more input video frames.

To encode the one or more input video frames for transmission may include to encode the one or more input video frames in accordance with an AV1 video coding standard.

To provide the determined noise synthesis parameters may include to provide the determined noise synthesis parameters for the client device to synthesize noise to apply to the one or more input video frames.

The system may further comprise a second processor to generate the one or more input video frames via a game application. The first processor may be distinct from the second processor.

In another example embodiment, a non-transitory computer readable medium embodies a set of executable instructions. The set of executable instructions is to manipulate at least one processor to: identify a quantization parameter (QP) associated with the one or more input video frames; encode, using the identified QP, the one or more input video frames for transmission to at least one client device; determine, based at least in part on the identified QP, one or more noise synthesis parameters; and initiate transmission of one or more encoded video frames to the at least one client device based on the encoding of the one or more input video frames. To initiate the transmission may include to provide the determined one or more noise synthesis parameters to the at least one client device.

The set of executable instructions may be further to manipulate the at least one processor to pre-process the one or more input video frames. The set of executable instructions may be further to manipulate the at least one processor to identify one or more video frame characteristics based on the pre-processing of the input video frames. To determine the one or more noise synthesis parameters may be further based in part on the one or more video frame characteristics. The one or more video frame characteristics may include a variance of at least one of the one or more input video frames.

To encode the one or more input video frames for transmission may include to encode the one or more input video frames in accordance with an AV1 video coding standard.

To provide the determined noise synthesis parameters may include to provide the determined noise synthesis parameters for the client device to synthesize noise to apply to the one or more input video frames.

The set of executable instructions may be further to manipulate the at least one processor to generate the one or more input video frames via a game application.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
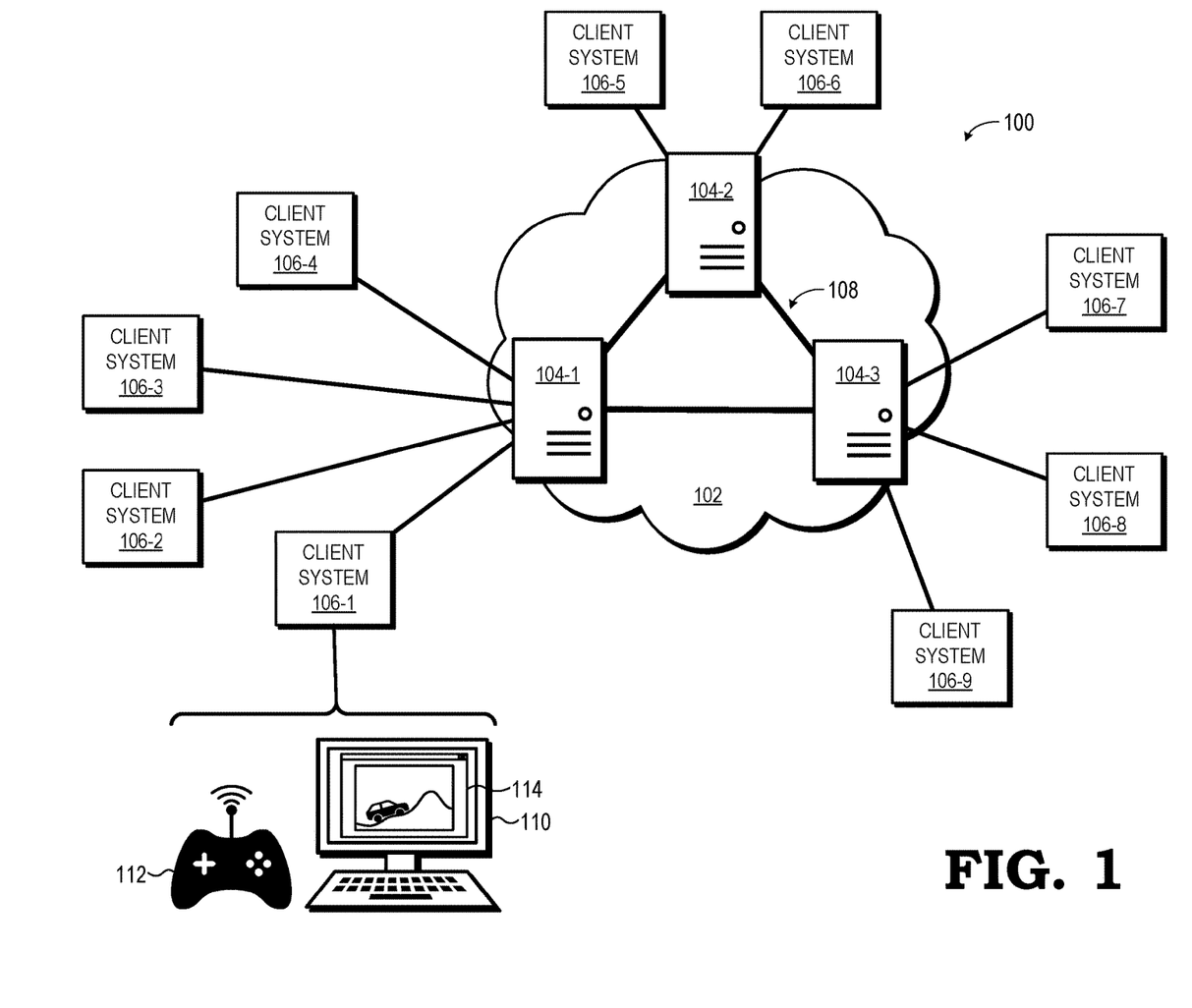
FIG. 1 is a block diagram illustrating a cloud gaming system facilitating multiplayer gaming via decentralized peer-to-peer player input and state messaging in accordance with some embodiments.

FIG. 1 is a block diagram illustrating a cloud gaming system 100 facilitating single-player and/or multiplayer (including massively multiplayer) gaming in accordance with at least one embodiment. The cloud gaming system 100 includes a cloud platform 102 having a plurality of servers 104 that are coupled to corresponding subsets of a plurality of client devices 106 via one or more networks, such as the Internet. The servers 104 are interconnected in the depicted embodiment via a high-bandwidth, low-latency inter-server messaging bus 108. The servers 104 typically are distributed in one or more data centers over a geographical area so as to reduce transmission latency through physical proximity. In the simplified example of FIG. 1, the cloud platform 102 includes three servers 104-1 to 104-3 supporting nine client devices 106-1 to 106-9, with client devices 106-1 to 106-4 served by server 104-1, client devices 106-5 and 106-6 served by server 104-2, and client devices 106-7 to 106-8 served by server 104-3. It will be appreciated that in a typical real-world implementation, the number of servers 104 and number of client devices 106 typically will be considerably higher.

In the depicted embodiment, each server 104 operates to execute a corresponding game platform instance that facilitates execution of one or more simulation instances of a gaming application for a corresponding player, each of these instances being referred to herein as a "player simulation instance." That is, the game platform instance provides various resources, such as communication/network management, resource management, media rendering encoding, and the like, so as to simulate execution of a gaming application for a corresponding player as though that gaming application was being played on a local gaming device, such as a personal computer (PC) or game console. Each player simulation instance thus represents execution, or simulation, of the gaming application for a corresponding player. To illustrate, a player instance can be considered to be a virtual game console; thus such instances are containers that enable a single game runtime including networking, rendering, audio and video encoding, streaming and receipt of user inputs for both single- and multi-player gaming applications.

Each client device 106 represents the hardware and software resources utilized to receive player input through manipulation of one or more input/output devices for at least one player, as well as to present the video and auto content representing the visual and audial content, respectively, of the gameplay for the at least one player. Examples of a client device 106 include a desktop computer, a notebook computer, a tablet computer, a compute-enabled cellular phone (that is, a "smart phone"), a compute-enabled television (that is, a "smart TV"), and the like. As illustrated with reference to client device 106-1, each client device 106 includes a display 110, at least one game controller 112, one or more network interfaces to couple to the network connecting the client device 106 to the corresponding server 104, processors, memory, mass storage, speakers, and other computing resources to process the incoming media streams as is well known in the art.

The client device 106 receives video and audio streams (not shown) generated from execution of a corresponding player simulation instance at a corresponding server 104, and utilizes its compute, storage, and display resources for decoding and displaying the video frames of the transmitted video stream and for decoding and outputting the corresponding audio content. In some embodiments, the processing and display of video and audio content from the gaming application executed at the server 104 is facilitated by a software application executed at the client device 106 (and represented in FIG. 1 by graphical user interface (GUI) 114). This software application can include, for example, a cloud-gaming-specific software application. In other embodiments, a more general software application is utilized, and the video stream and audio stream are formatted and transmitted by the server 104 to be compatible with this software application. For example, in one embodiment the client device 106 utilizes a web browser that utilizes a hypertext markup language (HTML) format for display of the video content represented by the video and output of the audio content represented by the associated audio stream, and the server 104 provides the video stream in a format and the audio stream in formats compatible with the HTML format for display via the web browser.

Being interactive, the executing player simulation instance utilizes player input to at least partially direct the gameplay experience of a gaming session with the player. This player input is received at least in part through the game controller 112, which comprises any of a variety of I/O devices or a combination thereof, such as a game to pad, joystick, keyboard, mouse, touchpad, trackball, steering wheel or yoke, pedal, dance pad, simulated gun, optical motion tracker, inertial sensor, light/laser source and detector, and the like. In some embodiments, the game controller 112 is tethered to the client device 106 such that player input data generated by a player's manipulation of the game controller 112 is provided to the corresponding server 104 via the client device 106. To illustrate, the game controller 112 can be wired or wirelessly connected to the client device 106 such that all data output by the game controller 112 is routed through a network interface between the client device 106 and the network connecting the client device 106 to the server 104. In other embodiments, the game controller 112 has a separate, independent network connection with the corresponding server 104 via a network. For example, the cloud gaming system 100 could employ a wireless local area network (WLAN) access point (not shown) local to the client device 106 and the game controller 112 and connected to the Internet, and wherein each of the client device 106 and the game controller 112 establishes a separate wireless connection with the WLAN access point to independently communicate with the corresponding server 104 over the Internet via the WLAN access point.

As a general overview of the cloud gaming system 100, the servers 104 leverage the high bandwidth and low latency of the inter-server messaging bus 108 to implement a massively multiplayer game through the use of a peer-to-peer infrastructure that allows coordination of gameplay between the individual player simulation instances supported by each game platform instance without necessitating centralized multiplayer gaming servers, and thereby eliminating the need for expensive server farms, server operation teams, and other expenses typically involved in supporting massively multiplayer games through conventional centralized techniques.

Because maintaining low input latency (the delay between a user providing client input and receiving responsive server output from the game) is critical for cloud gaming applications, such applications are associated with relatively high bandwidth requirements. In order to meet these bandwidth requirements, and maintain low-latency video stream, hardware-accelerated encoders (e.g., hardware-accelerated AV1, Advanced Video Coding (AVC) or "H.264," VP9, and High Efficiency Video Coding (HEVC) encoders) have been deployed on various cloud gaming platforms to ensure that the user is provided with high-quality graphics during gameplay. However, banding artifacts are often visible, such as in dark or low-detail areas of the video stream. These and other graphical artifacts may be distracting to the user, and may operate as a disincentive to use such cloud gaming platforms.

Figure 2:
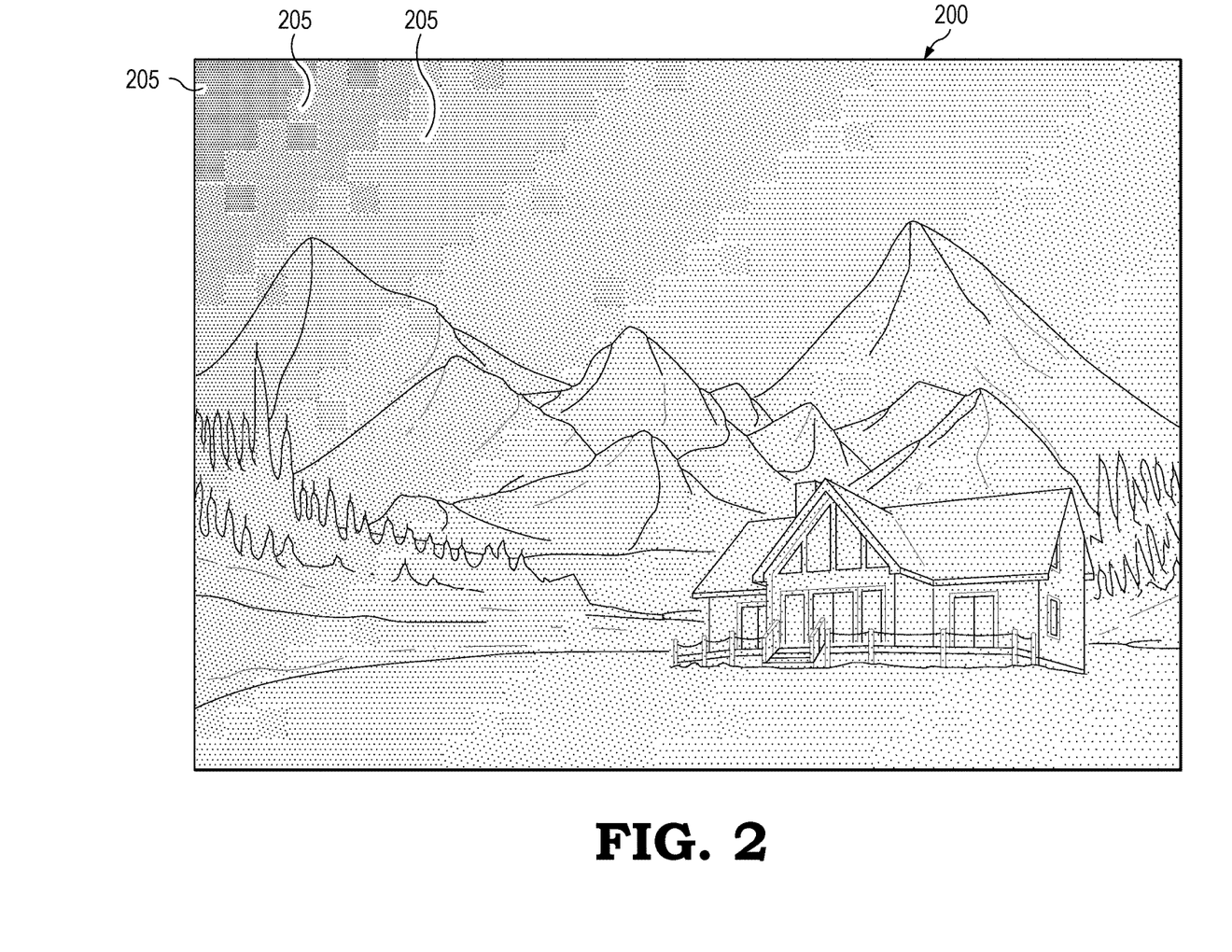
FIG. 2 depicts an image of a video frame that has been processed by a typical hardware-accelerated encoder used to encode a game application output video stream.

FIG. 2 depicts an example single video frame 200 of an image encoded by a typical hardware-accelerated encoder used to encode game application output. The video frame includes several areas 205 (which in the illustration of FIG. 2 only explicitly indicates three such areas for clarity) that include several apparent banding artifacts, lowering the perceived quality of the video frame.

Such banding artifacts may result, for example, when a remote server executing a game application attempts to render a smooth gradient of color shades, such as a blue that only varies a little (in RGB color terms) across a large area of sky. An encoder typically utilizes quantization for efficient compression, which may result in incorrect representation of small variations in pixels.

Eliminating such banding artifacts in real-time in order to stream high-quality video to different clients is a challenge for any cloud gaming platform to solve in order to attract more game players. The encoder may attempt to reduce any resulting banding artifacts by using a lower quantization parameter (QP) during compression, but such approaches typically result in high bitrates poorly suited for interactive cloud-based gaming applications. Thus, any decoder conforming to such noise synthesis-capable coding standards may be forced to add parameterized noise to produce a desired dithering effect for transmitted video frames without increasing an encoded transmission bitrate of those video frames. It will be appreciated that as used herein, any "transmission" of video frames, video and audio content or other content, parameters, configuration settings, and the like may refer to a transmission of any data or information representative and/or indicative of such elements.

Certain video coding standards, such as the AV1 coding standard, provide noise synthesis capabilities in order to provide bandwidth advantages by parameterizing film grain noise. Film grain noise may be prevalent in many video content (both intentionally and unintentionally), and is typically difficult to compress. Generally, such approaches involve extracting noise from the video content and then encoding the noise-free content. The extracted noise may be parameterized, and the client-side decoder may regenerate the noise from the simple parameters. This results in significant bitrate savings relative to approaches that instead encode noisy content.

Figure 3:
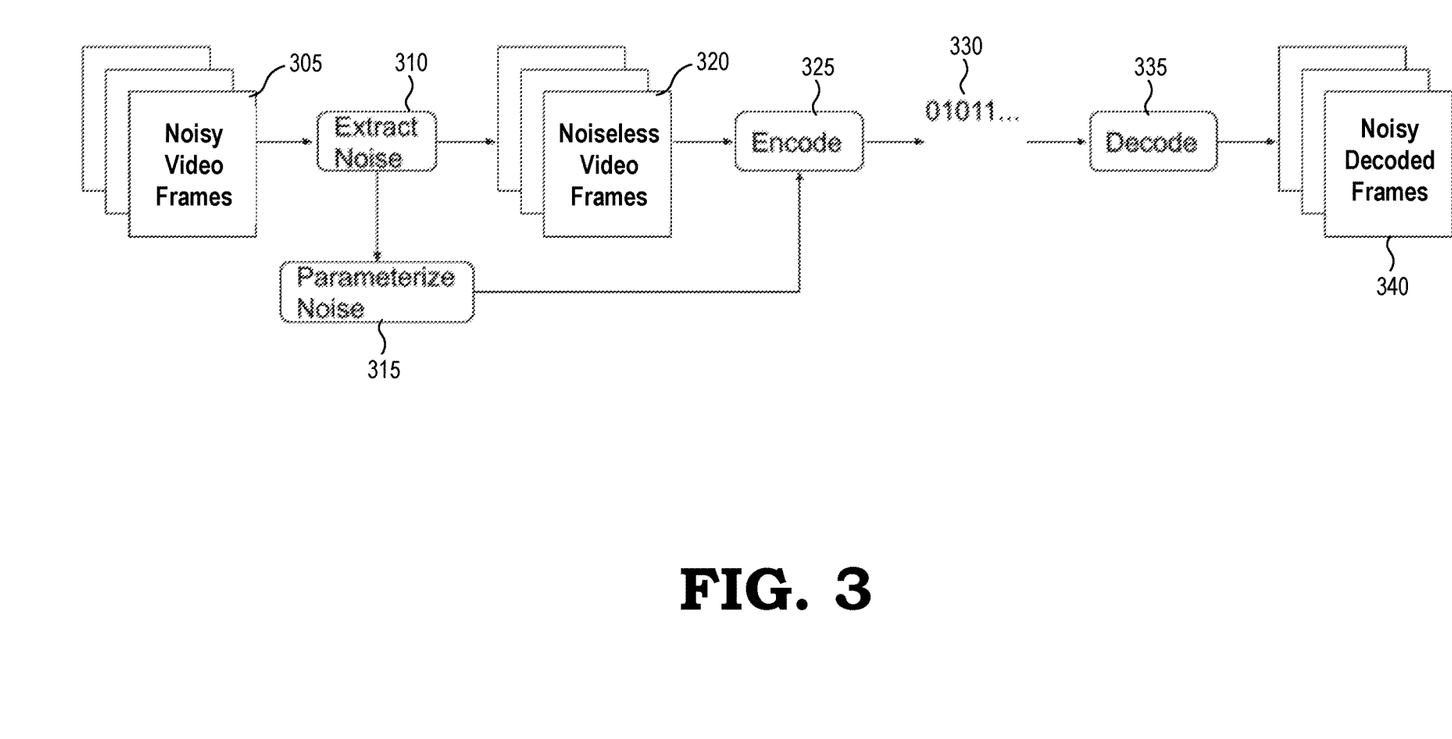
FIG. 3 is a block schematic diagram illustrating an example of operations associated with video coding standards that support noise synthesis.

FIG. 3 is a block schematic diagram illustrating certain operations of coding standards that support film grain (noise) synthesis, in which noisy video frames 305 are made easier to encode without destroying the artistic integrity of the content (i.e., conserving noise). The noise in the video frames 305 is extracted at block 310 to produce noiseless video frames 320, with the extracted noise being analyzed and parameterized in block 315. The noiseless video frames are encoded at block 325. The parameters describing the original noise are sent along with the encoded bitstream 330, which is decoded in block 335. During or after the decoding, the decoder uses the generated noise parameters to artificially reproduce the original noise as part of the decoded video frames 340.

Given that gaming applications typically generate synthetic video content, such video content typically does not have film grain noise. However, techniques provided herein may be used to mitigate or even eliminate banding and other graphical artifacts by utilizing generated noise parameters to create client-side dithering in a computationally non-intensive and bandwidth-conserving manner.

Systems and techniques described herein are generally directed to embodiments of an efficient real-time pre-encoding scheme for determining and generating appropriate synthetic noise parameters for use in mitigating or eliminating banding and other graphical artifacts while enabling streaming video content at bit rates sufficient for cloud gaming or other video streaming applications. In certain embodiments, the described systems and techniques may be implemented using a graphics processor ("GPU"), such as via one or more GPU shader modules It will be appreciated that while systems, techniques, and schema are discussed herein with respect to encoding, decoding, and transmission of video content that may utilize particular examples relevant to cloud gaming and game content, they may be applied to additional non-gaming contexts, such as image and video encoding, decoding, and transmission. Examples provided herein may refer to scenarios involving the encoding and transmission of gaming content due to particular bandwidth and network latency issues relevant to such content, and should not be construed to indicate that the techniques described are limited to those scenarios.

Figure 4:
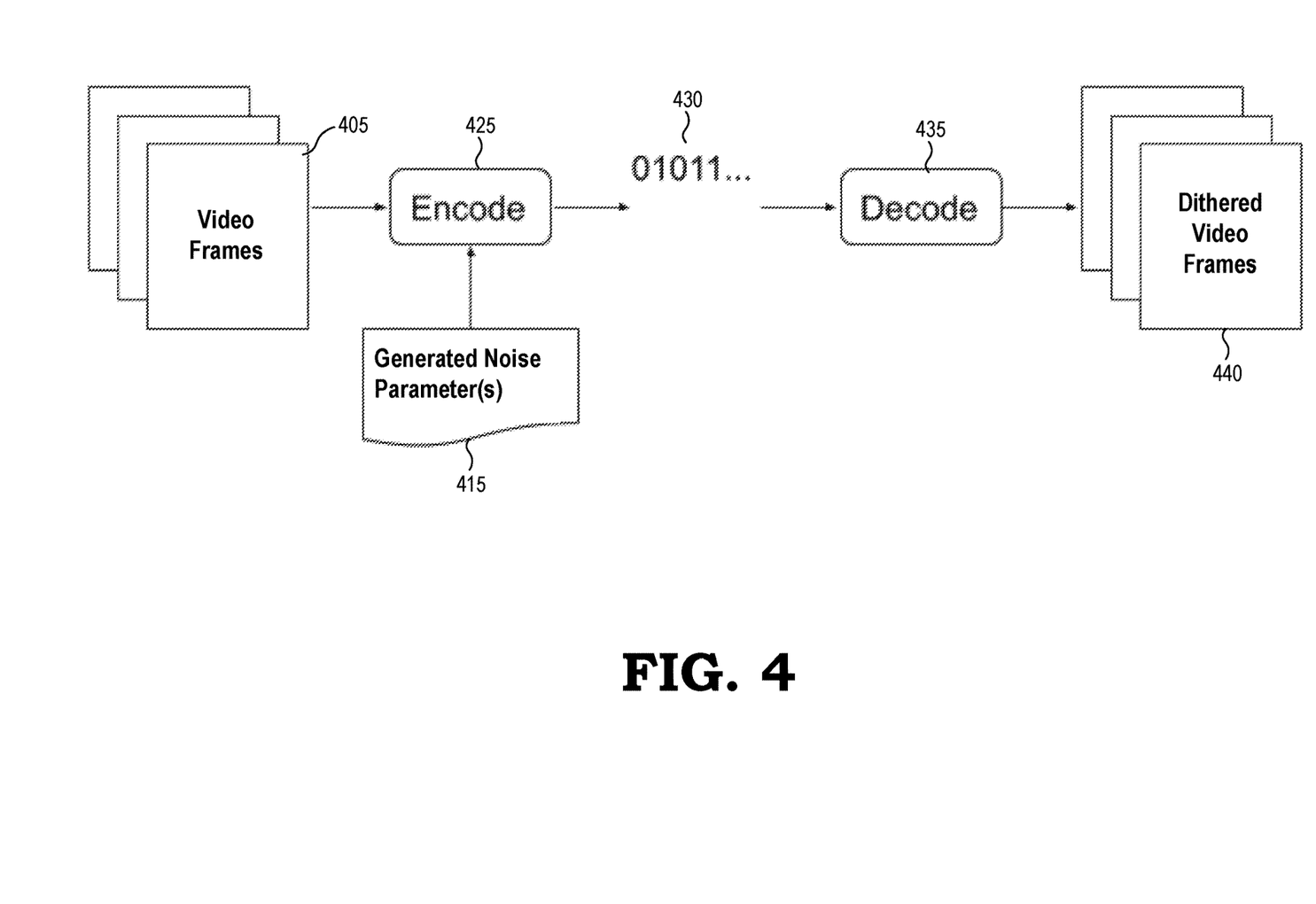
FIG. 4 is a block schematic diagram illustrating an example of operations in accordance with one or more embodiments, depicting the use of generated noise parameters with synthetic noise-capable video coding standards.

FIG. 4 is a block schematic diagram illustrating operations in accordance with one or more embodiments, depicting the use of generated noise parameters in conjunction with synthetic noise-capable video coding standards. Video frames 405, which in various embodiments may be generated by a gaming application and therefore do not include significant film grain or other noise, are encoded at block 425. One or more noise parameters 415 are generated and then transmitted with (or separately from) the encoded bitstream 430 to a client device (not shown), which decodes the transmitted bitstream in block 435. During or after the decoding, the client-side decoder uses the one or more generated noise parameters 415 to generate and add synthetic noise to the decoded bitstream in order to create and present dithered video frames 440. In these and other embodiments, the dithering of video frames provided by adding the synthetic noise to the decoded bitstream mitigates or even eliminates issues of banding and other graphical artifacts resulting from the encoding process.

It will be appreciated that the generation of noise parameters 415 may enable the creation of dithered video frames that appear "natural"—that is, without banding or other graphical artifacts, and without the resulting synthetic noise added to such video frames being overly noticeable to a user. For example, simply adding any random white noise may result in a less natural looking, grainy image.

Figure 5:
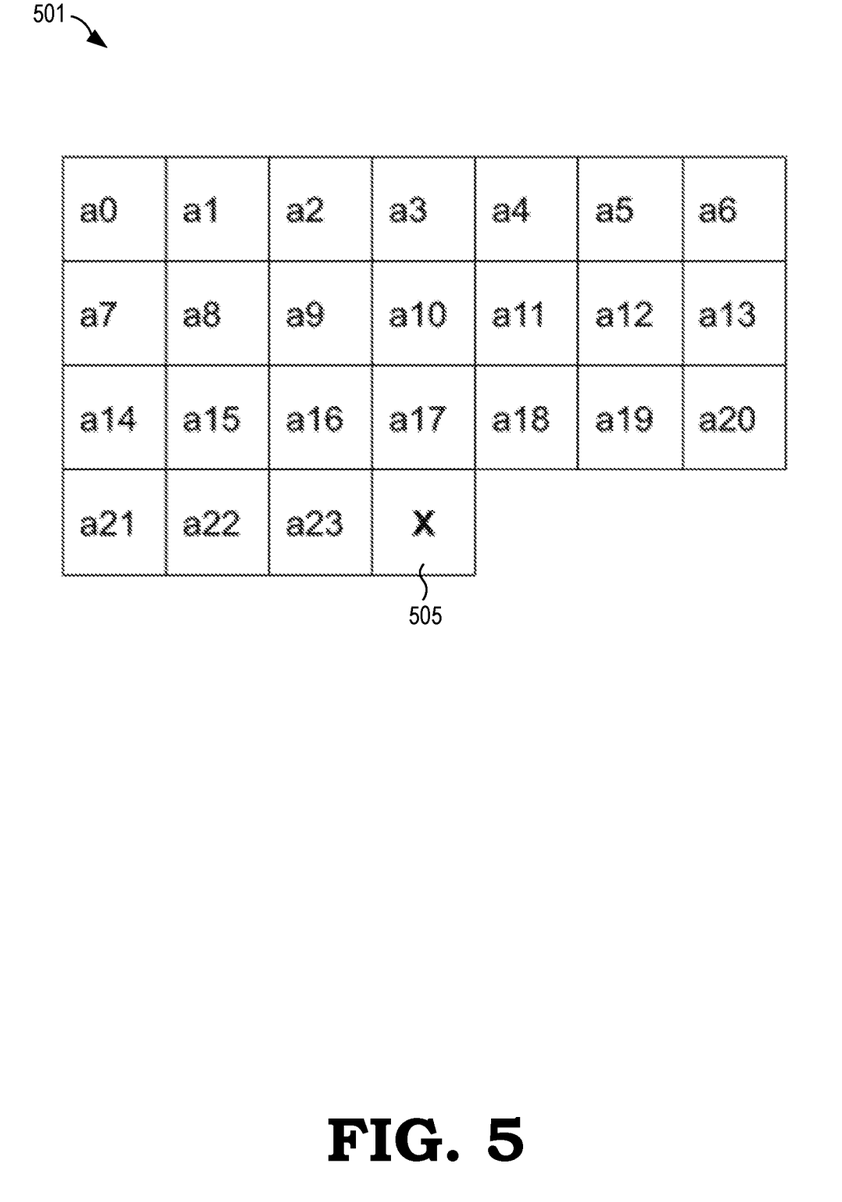
FIG. 5 illustrates an example of an autoregressive model for describing a particular synthetic noise pattern in accordance with one or more embodiments.

FIG. 5 illustrates an example of an autoregressive model 501 for describing a synthetic noise pattern. In the depicted embodiment, the noise at pixel position 505—denoted as N(X)—is derived as a weighted sum of Gaussian noise and noise added at each of positions a0-a23, such that:

$$N(X)=C(a0)*N(a0)+ \ldots +C(a23)*N(a23)+G$$

where C(a #) is a scaling factor to apply to the noise N(a #) at position a #, and G is the unit variance Gaussian noise. It will be appreciated that having C=0 for all positions a # will result in an outcome using only the unit variance Gaussian noise, which generally yields poor results—the less natural looking, grainy image noted above. Utilizing this model with nonzero scaling factors C(a #), a more natural looking noise pattern may be generated.

Figure 6:
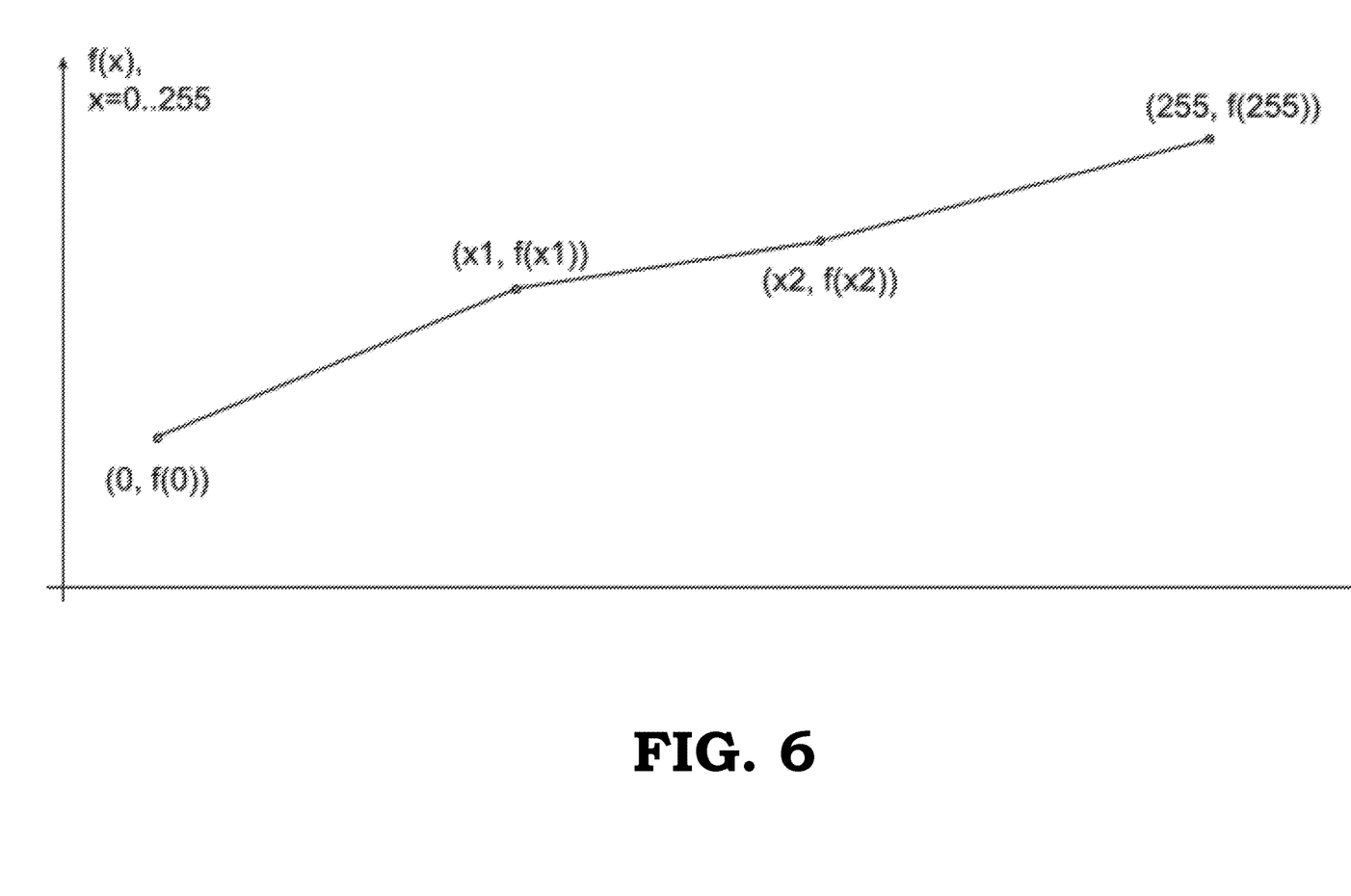
FIG. 6 depicts a relative strength of synthetic noise when modeled as a piecewise linear function f(x), in accordance with one or more embodiments.

In the embodiment of FIG. 6, a relative strength of the synthetic noise is modeled as a piecewise linear function f(x). For example, for a pixel component value x (in which x=0 . . . 255 for an 8-bit input), the noise to be added is f(x)*N( ), where N( ) is the noise derived as discussed above with respect to FIG. 4. FIG. 6 illustrates an example of how f(x) may be described in certain embodiments, with a list of the points where the slope of the piecewise linear function f(x) changes.

In certain embodiments, the determination of effective pre-encoding parameters for use with post-encoding synthetic noise generation may be performed once, such that a same pre-generated noise pattern can be used to process and transmit all subsequent input video frames. In other embodiments, the determination of effective parameters may be performed dynamically and in real-time, such as responsive to changes in one or more characteristics of the input video frames themselves. For example, in certain embodiments each input video frame may be analyzed to determine a quantization parameter (QP) for encoding the input video frame, and parameters for generating synthetic noise may be determined based at least in part on that QP.

Figure 7:
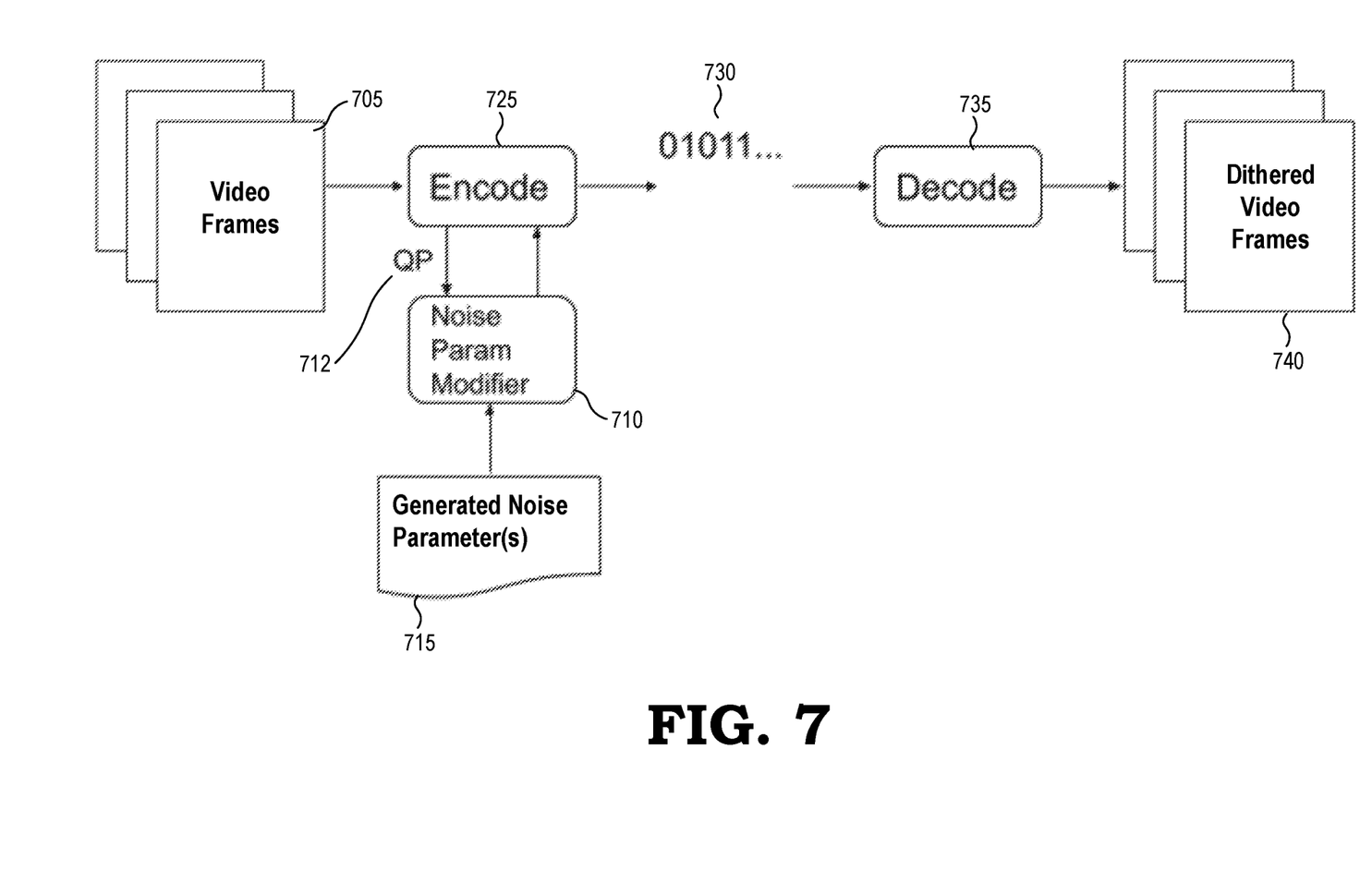
FIG. 7 is a block schematic diagram illustrating an example of operations in accordance with one or more embodiments, depicting the use of dynamically generated noise parameters with synthetic noise-capable video coding standards.

FIG. 7 is a block schematic diagram illustrating an example of operations in accordance with one or more embodiments, depicting the use of dynamically generated noise parameters with synthetic noise-capable video coding standards. In the depicted embodiment, video frames 705 are generated by a gaming application and therefore do not include significant film grain or other noise. The input video frames 705 are encoded at block 725. However, in contrast to the embodiment of FIG. 4, the one or more generated noise parameters are modified based on a parameter of the encoding process itself, and in particular on the QP associated with encoding of the input video frames 705. As one example, input video frames that are encoded using a smaller QP may be subject to less noticeable banding or other graphical artifacts, indicating that a lesser degree of synthetic noise may be sufficient to mitigate or eliminate those graphical artifacts. Input video frames that are encoded using a larger QP may instead be subject to more noticeable banding or other graphical artifacts, indicating that a greater degree of synthetic noise may be needed to mitigate or eliminate such artifacts. Thus, in certain embodiments the noise parameter modifier 710 may be determined as a function of the quantization parameter 712 associated with the encoding 725.

The one or more generated noise parameters 715, modified via the noise parameter modifier 710, are then transmitted to a client device with (or separately from) the encoded bitstream 730, which is decoded by the client device in block 735. During or after the decoding, the client-side decoder uses the one or more noise parameters to generate and add synthetic noise to the decoded bitstream, based on the provided set of one or more modified noise parameters, in order to create and present dithered video frames 740. It will be appreciated that although in the embodiment of FIG. 7 the modification of the one or more generated noise parameters 715 is depicted separately for ease of illustration, in certain embodiments the "modification" of one or more noise parameters may be performed as part of the generation of those one or more noise parameters, such that no separate modifying operation is performed on noise parameter(s) already generated.

In certain embodiments, one or more synthetic noise parameters may be generated and/or modified based further on preprocessing of the input video frames, such as if the preprocessing of the input video frames utilizes or identifies certain characteristics prior to encoding. For example, a variance and/or other characteristics of one or more input video frames may be identified as part of preprocessing those input video frames.

Figure 8:
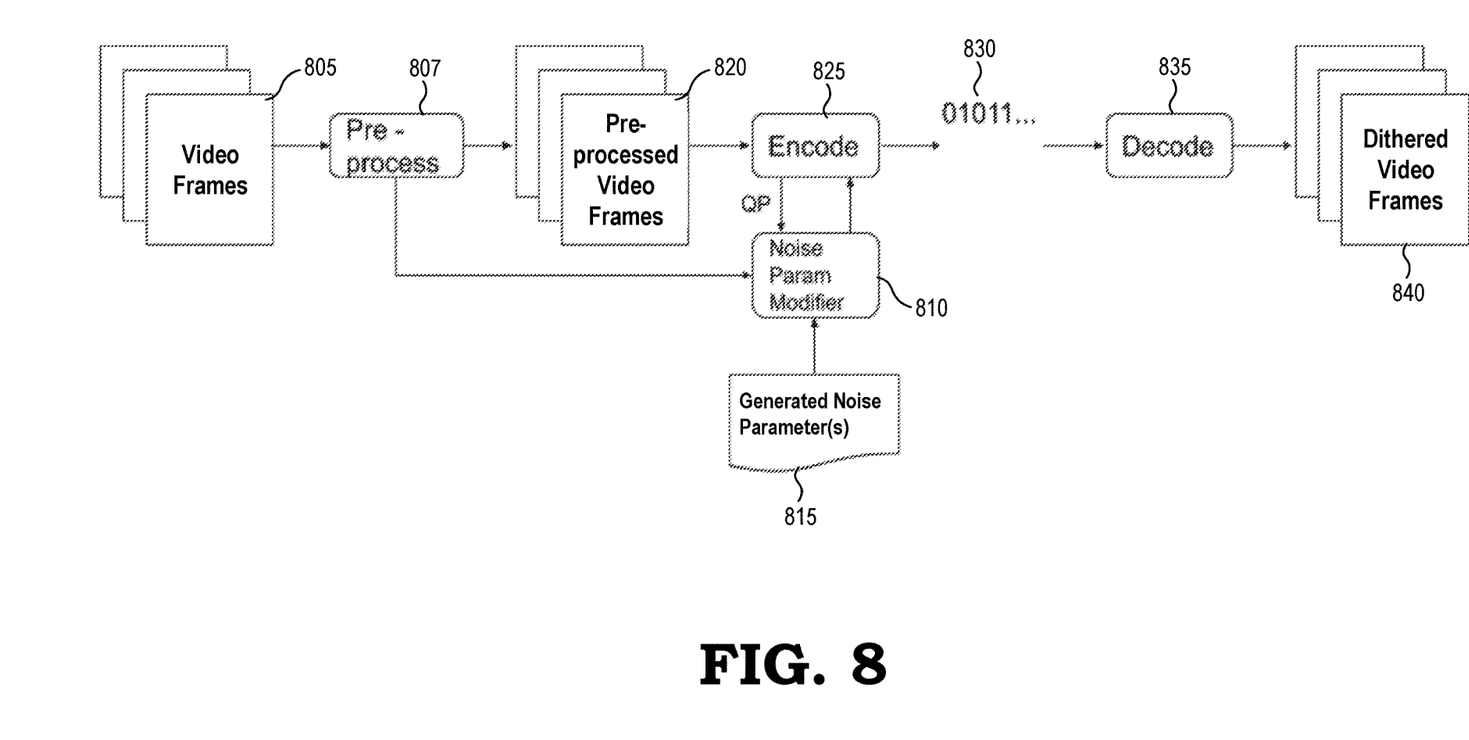
FIG. 8 is a block schematic diagram illustrating an example of operations in accordance with one or more embodiments, depicting the modification of generated noise parameters based on video frame pre-processing characteristics.

FIG. 8 is a block schematic diagram illustrating an example of operations in accordance with one or more embodiments, depicting the use of dynamically generated noise parameters with synthetic noise-capable video coding standards. As with the embodiments of FIGS. 4 and 7, in the depicted embodiment the input video frames (in this example, input video frames 805) are generated by a gaming application and therefore do not include significant film grain or other noise. The input video frames 805 are pre-processed at block 807, during which one or more characteristics of the input video frames are identified. The pre-processed video frames 820 are encoded at block 825. In addition, a set of one or more synthetic noise parameters are generated at block 815, and modified using a noise parameter modifier 810 that is determined (a) based on the QP associated with the encoding 825 of pre-processed video frames 820 and (b) on at least one of the one or more characteristics of input video frames 805 that were identified during the pre-processing 807. As one non-limiting example, the noise parameter modifier 810 may be further based in part on a variance of each pre-processed video frame 820. As noted with respect to the embodiment of FIG. 7, it will be appreciated that although in the embodiment of FIG. 8 the modification of the one or more generated noise parameters 815 is depicted separately for ease of illustration, in certain embodiments modification of the set of one or more noise parameters may be performed as part of the generation of that set of one or more noise parameters, such that no separate modifying operation is performed.

The generated noise parameter(s) 815, modified via the noise parameter modifier 810, are then transmitted to a client device with (or separately from) the encoded bitstream 830, which is decoded in block 835 by the client device (not shown). During or after the decoding, the client-side decoder uses the one or more noise parameters to generate and add synthetic noise to the decoded bitstream, based on the provided set of one or more modified noise parameters, in order to create and present dithered video frames 840.

Figure 9:
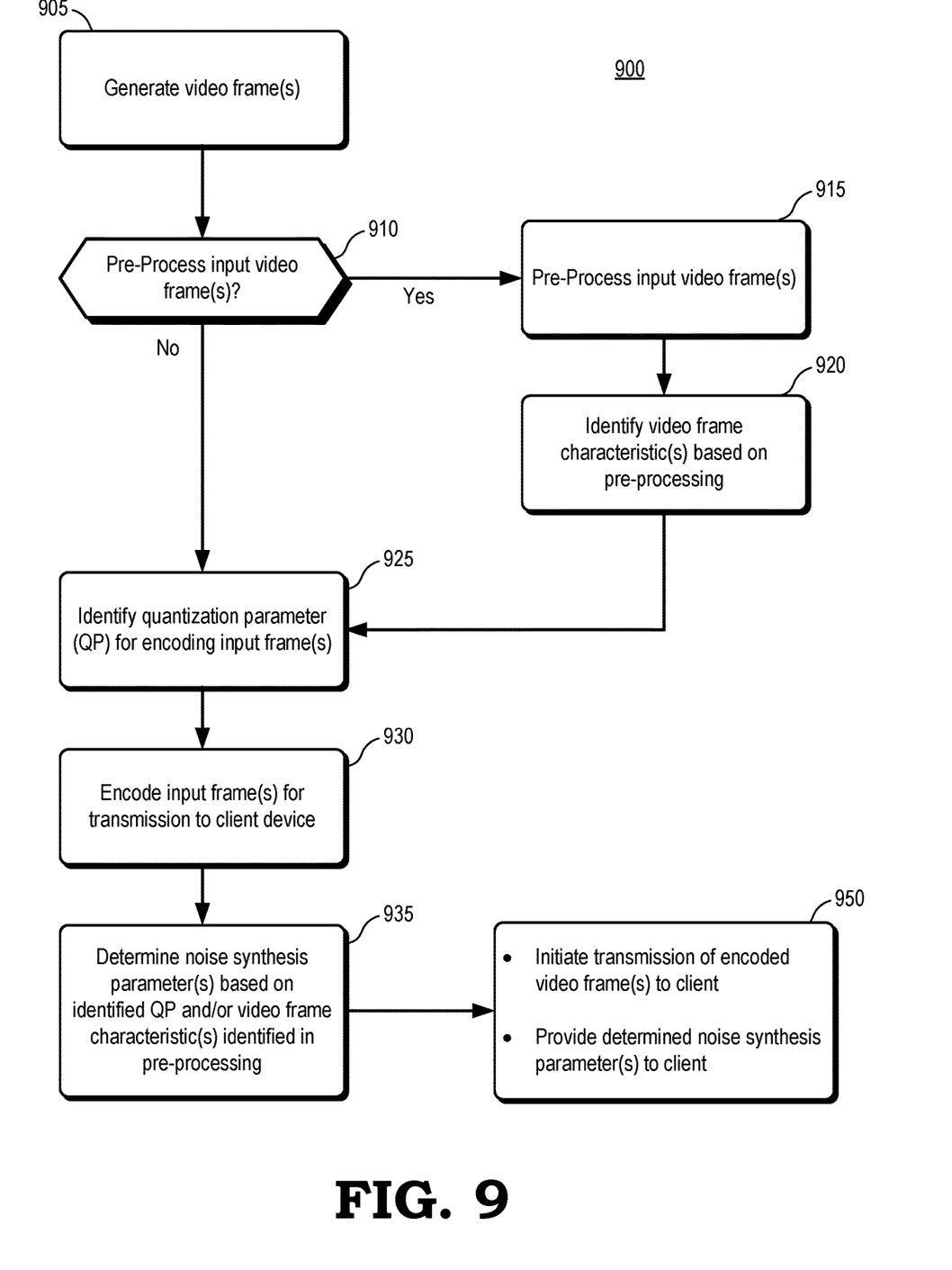
FIG. 9 is a block diagram illustrating an overview of an operational routine 800 of a processor-based parameterized noise synthesis system in accordance with one or more embodiments.

FIG. 9 is a block diagram illustrating an overview of an operational routine 900 of a processor-based parameterized noise synthesis system (such as may comprise a portion of any of servers 104 of FIG. 1, and/or computing system 1000 of FIG. 10) in accordance with one or more embodiments. In certain embodiments, the operational routine 900 may be performed in real-time (e.g., as each video frame of a larger video stream is generated) in order to prepare one or more video image frames for encoding and transmission, such as if such video image frames are generated as part of sequential output from a game application being executed by one or more servers of a cloud gaming platform.

The routine begins at block 905, in which a processor-based parameterized noise synthesis system generates one or more video frames. In various embodiments, the one or more video frames may be generated by a first processor, such as a single- or multi-core central processing unit (CPU), and provided to a distinct second processor to (such as a single- or multi-core GPU) for noise parameter generation and/or other operations prior to the encoding of the input video frame for transmission to one or more client devices. The routine proceeds to block 910.

At block 910, the processor-based parameterized noise synthesis system determines whether the one or more input video frames are to be pre-processed prior to encoding, such as based on one or more defined criteria, on one or more user preferences, or in response to an explicit request. If so, the routine proceeds to block 915; otherwise, the routine proceeds to block 925.

At block 915, the processor-based parameterized noise synthesis system performs one or more pre-processing operations on the one or more input video frames. The routine then proceeds to block 920, in which the processor-based parameterized noise synthesis system identifies one or more pre-processing characteristics based on the pre-processing. It will be appreciated that although the pre-processing operations and that the identification of the one or more pre-processing characteristics are depicted here as distinct sequential operations for purposes of clarity, in various embodiments the pre-processing of the input video frames and the identification of the one or more video frame characteristics may be performed simultaneously, in parallel, or in another non-sequential manner. The routine proceeds to block 925.

At block 925, the processor-based parameterized noise synthesis system identifies a quantization parameter QP for encoding the one or more input video frames. The routine then proceeds to block 930, in which the processor-based parameterized noise synthesis system encodes the one or more input video frames in accordance with a synthetic noise-capable video coding standard. (It will be appreciated that if it was determined in block 910 to pre-process the input video frames, the encoding operation is performed on the pre-processed video frames.) The routine then proceeds to block 935.

At block 935, the processor-based parameterized noise synthesis system determines a set of one or more noise synthesis parameters based on the identified quantization parameter and, if it was determined in block 910 to pre-process the one or more input video frames, on one or more video frame characteristics identified during the pre- to processing. As discussed in greater detail elsewhere herein, in various embodiments the set of one or more noise synthesis parameters may be generated in a unified operation, or may first be generated and then modified based on the identified QP and/or video frame characteristic(s). The routine then proceeds to block 950.

At block 950, the processor-based parameterized noise synthesis system initiates transmission of the one or more encoded video frames to one or more client devices, and provides the determined set of one or more noise synthesis parameters, such as for use by a decoder of the client device in generating synthetic parameterized noise for addition to the decoded video frame(s).

Figure 10:
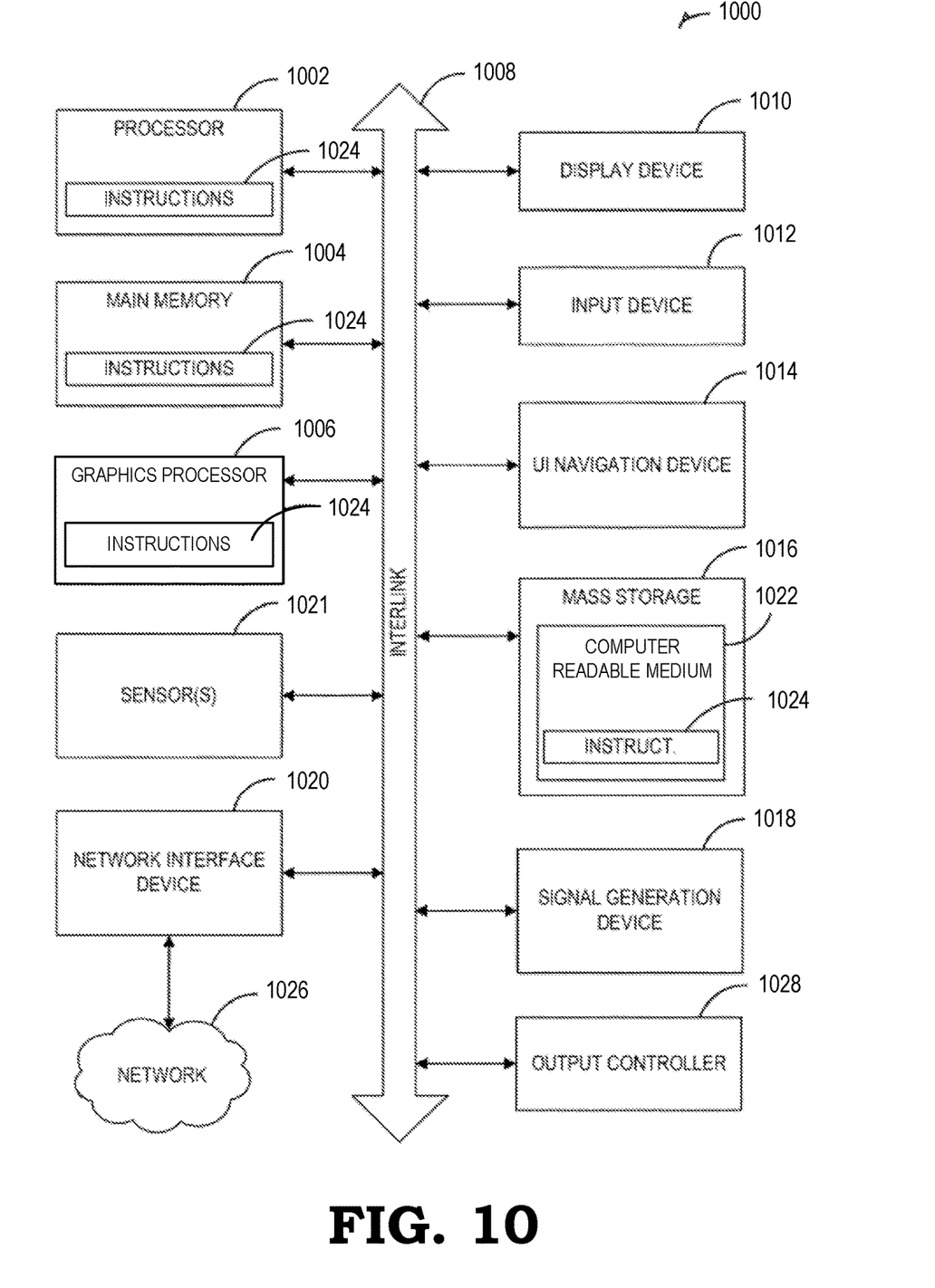
FIG. 10 is a component-level block diagram illustrating an example of a computing system suitable for implementing one or more embodiments.

FIG. 10 is a component-level block diagram illustrating an example of a computing system 1000 suitable for implementing one or more embodiments. In alternative embodiments, the computing system 1000 may operate as a standalone device or may be connected (e.g., networked) to other systems. In various embodiments, one or more components of the computing system 1000 may be incorporated as or within one or more server computing systems to provide various types of game application output or other video content. It will be appreciated that an associated server computing device may include some components of computing system 1000, but not necessarily all of them. In a networked deployment, the computing system 1000 may operate in the capacity of a server machine, a client machine, or both in server-client network environments. In at least one example, the computing system 1000 may act as a peer system in peer-to-peer (P2P) (or other distributed) network environment. The computing system 1000 may be a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The computing system 1000 may include one or more hardware processors 1002 (e.g., a central processing unit (CPU), a hardware processor core, or any combination thereof), a main memory 1004, and a graphics processing unit (GPU) 1006, some or all of which may communicate with each other via an interlink (e.g., bus) 1008. The computing system 1000 may further include a display unit 1010 (such as a display monitor or other display device), an alphanumeric input device 1012 (e.g., a keyboard or other physical or touch-based actuators), and a user interface (UI) navigation device 1014 (e.g., a mouse or other pointing device, such as a touch-based interface). In one example, the display unit 1010, input device 1012, and UI navigation device 1014 may comprise a touch screen display. The computing system 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The computing system 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a computer readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within GPU 1006, or within the hardware processor 1002 during execution thereof by the computing system 1000. In an example, one or any combination of the hardware processor 1002, the main memory 1004, the GPU 1006, or the storage device 1016 may constitute computer readable media.

While the computer readable medium 1022 is illustrated as a single medium, the term "computer readable medium" may include a single medium or multiple media (e.g., a centralized or distributed database, and/or associated caches and servers) configured to store the one or more instructions 1024.

The term "computer readable medium" may include any medium that is capable of storing, encoding, or carrying instructions for execution by the computing system 1000 and that cause the computing system 1000 to perform any one or more of the techniques of the present disclosure, or that is capable of storing, encoding or carrying data structures used by or associated with such instructions. Non-limiting computer readable medium examples may include solid-state memories, and optical and magnetic media. In an example, a massed computer readable medium comprises a computer readable medium with a plurality of particles having invariant (e.g., rest) mass. Accordingly, massed computer readable media are not transitory propagating signals. Specific examples of massed computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the computing system 1000, and includes digital or analog communications signals or other intangible medium to facilitate communication of such software.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments to disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
   for one or more input video frames:
   identifying a quantization parameter (QP) for the one or more input video frames;
   encoding, using the identified QP, the one or more input video frames for transmission to at least one client device;
   determining, based at least in part on the identified QP and independent of any noise present in the one or more input video frames, one or more noise synthesis parameters; and
   initiating transmission of one or more encoded video frames to the at least one client device based on the encoding of the one or more input video frames, wherein initiating the transmission includes providing the determined one or more noise synthesis parameters to the at least one client device.

2. The computer-implemented method of claim 1, further comprising generating the one or more input video frames via a game application.

3. The computer-implemented method of claim 1, wherein the one or more noise synthesis parameters are determined as a function of the identified QP.

4. The computer-implemented method of claim 1, further comprising pre-processing the one or more input video frames prior to the encoding.

5. The computer-implemented method of claim 4, further comprising identifying one or more video frame characteristics based on the pre-processing of the input video frames, and wherein the determining of the one or more noise synthesis parameters is further based in part on the one or more video frame characteristics.

6. The computer-implemented method of claim 5, wherein the one or more additional video frame characteristics include a variance of at least one of the one or more input video frames.

7. The computer-implemented method of claim 1, wherein encoding the one or more input video frames for transmission includes encoding the one or more input video frames in accordance with an AVI video coding standard.

8. The computer-implemented method of claim 1, wherein providing the determined noise synthesis parameters includes providing the determined noise synthesis parameters for use by the at least one client device in synthesizing noise to apply to the one or more transmitted video frames.

9. A system comprising at least one processor and a memory coupled to the at least one processor and storing a set of executable instructions, that when executed by the at least one processor, manipulate the at least one processor to perform the method of claim 1.

10. A system, comprising:
a first processor to, for one or more input video frames:
identify a quantization parameter (QP) associated with the one or more input video frames;
encode, using the identified QP, the one or more input video frames for transmission to at least one client device;
determine, based at least in part on the identified QP and independent of any noise present in the one or more input video frames, one or more noise synthesis parameters; and
initiate transmission of one or more encoded video frames to the at least one client device based on the encoding of the one or more input video frames, wherein to initiate the transmission includes to provide the determined one or more noise synthesis parameters to the at least one client device.

11. The system of claim 10, wherein the first processor is further to pre-process the one or more input video frames.

12. The system of claim 10, wherein the first processor is further to identify one or more video frame characteristics based on the pre-processing of the input video frames, and wherein to determine the one or more noise synthesis parameters is further based on the one or more video frame characteristics.

13. The system of claim 12, wherein the one or more video frame characteristics include a variance of at least one of the one or more input video frames.

14. The system of claim 10, wherein to encode the one or more input video frames for transmission includes to encode the one or more input video frames in accordance with an AVI video coding standard.

15. The system of claim 10, wherein to provide the determined noise synthesis parameters includes to provide the determined noise synthesis parameters for the client device to synthesize noise to apply to the one or more input video frames.

16. The system of claim 10, further comprising a second processor to generate the one or more input video frames via a game application.

17. The system of claim 16, wherein the first processor is distinct from the second processor.

18. A server computing system, comprising:
a set of one or more processors to:
generate one or more input video frames via execution of an application;
identify a quantization parameter (QP) associated with the one or more input video frames;
encode, using the identified QP, the one or more input video frames for transmission to at least one client device;
determine, based at least in part on the identified QP and independent of any noise present in the one or more input video frames, one or more noise synthesis parameters; and
initiate transmission of one or more encoded video frames to the at least one client device based on the encoding of the one or more input video frames; and
a network interface that is coupled to the set of one or more processors and that is configured to provide the one or more encoded video frames and the determined one or more noise synthesis parameters to one or more client computing systems via at least one computer network.

19. The server computing system of claim 18, wherein the set of one or more processors is further to manipulate the at least one processor to pre-process the one or more input video frames.

20. The server computing system of claim 19, wherein the set of executable instructions is further to manipulate the at least one processor to identify one or more video frame characteristics based on the pre-processing of the input video frames, and wherein to determine the one or more noise synthesis parameters is further based in part on the one or more video frame characteristics.

21. The server computing system of claim 20, wherein the one or more video frame characteristics include a variance of at least one of the one or more input video frames.

22. The server computing system of claim 18, wherein to encode the one or more input video frames for transmission includes to encode the one or more input video frames in accordance with an AVI video coding standard.

* * * * *